United States Patent
Van Der Voort

Patent Number: 6,144,152
Date of Patent: Nov. 7, 2000

[54] LUMINESCENT SCREEN FOR LOW PRESSURE MERCURY DISCHARGE LAMP WITH SPECIFIC EMISSION RANGE

[75] Inventor: Dick Van Der Voort, Eindhoven, Netherlands

[73] Assignee: U.S. Phillips Corporation, New York, N.Y.

[21] Appl. No.: 09/208,510

[22] Filed: Dec. 9, 1998

[30] Foreign Application Priority Data

Dec. 19, 1997 [EP] European Pat. Off. ............... 97204030

[51] Int. Cl.⁷ ...................................................... H01J 1/62
[52] U.S. Cl. ........................... 313/486; 313/487; 313/467; 313/468
[58] Field of Search ..................................... 313/485, 486, 313/487, 467, 468

[56] References Cited

U.S. PATENT DOCUMENTS

| | | | |
|---|---|---|---|
| 3,937,998 | 2/1976 | Verstegen et al. | 313/487 |
| 4,176,294 | 11/1979 | Thornton | 313/485 |
| 4,267,485 | 5/1981 | Murakami et al. | 313/486 |
| 4,800,319 | 1/1989 | Kemenade et al. | 313/487 |
| 5,402,036 | 3/1995 | Ito | 313/487 |
| 5,854,533 | 12/1998 | Pappalardo | 313/487 |

*Primary Examiner*—Vip Patel
*Attorney, Agent, or Firm*—F. Brice Faller

[57] ABSTRACT

Color rendering indices Ra,8 between 80 and 90 and R9 greater than 20, and a color point on or near the Planckian curve, are achieved with a lamp vessel provided with a luminescent screen including a first luminescent substance which emits predominantly between 520 nm and 565 nm, a second luminescent substance which emits predominantly between 590 nm and 630 nm, and a third luminescent substance which emits predominantly in the range between 615 nm and 780 nm.

9 Claims, 1 Drawing Sheet

LUMINESCENT SCREEN FOR LOW PRESSURE MERCURY DISCHARGE LAMP WITH SPECIFIC EMISSION RANGE

BACKGROUND OF THE INVENTION

The invention relates to a low-pressure mercury discharge lamp having a color rendering index Ra,8 between 80 and 90, a color point on or near the Planckian curve and comprising a gastight lamp vessel which allows passage of visible light, contains Hg and one or more inert gases and is provided with a luminescent screen including a first luminescent substance which emits predominantly between 520 nm and 565 nm, and a second luminescent substance which emits predominantly between 590 nm and 630 nm.

The color rendering index Ra,8, as well as the color rendering index R9 mentioned later in this description, is defined as in "A user-oriented description of color rendition of light sources" by J. T. C. van Kemenade, CIE 1995 Congress. A low-pressure mercury discharge lamp, hereinafter also referred to as lamp, as mentioned in the opening paragraph is disclosed in U.S. Pat. No. 4,176,294 and in Dutch patent 164,697. During operation of the lamp, the first and the second luminescent substance emit, respectively, green and red light while the Hg present in the discharge causes a quantity of blue light to be directly generated. As a result of the green, red and blue contribution to the luminous flux of the lamp, the color of the light generated by the lamp is white. Since the quantity of blue light directly generated by Hg is too small to generate white light having a high color temperature, the luminescent screen generally comprises, in addition to the first and the second luminescent substance, a further luminescent substance which emits blue light during operation of the lamp.

The color of visible radiation is characterized by the color co-ordinates (x,y) which determine the color point in the color triangle (see Publication CIE, No. 15 (E-1.3.1.), 1971). A low-pressure mercury discharge lamp for general lighting purposes should emit light which can be regarded as being "white". In the color triangle, white radiation is found at color points situated on the Planckian curve. This curve, also referred to as line of the full radiators, and hereinafter referred to as the P curve, includes the color points of the radiation emitted by a completely black body at different temperatures (the so-called color temperature). A specific color temperature is not only assigned to a specific point on the P curve, but also to radiation whose color co-ordinates are situated on a line intersecting the P curve at this point (see said Publication CIE, No. 15). If this radiation has a color point near the P curve, this radiation is also considered to be white light with said specific color temperature. In this description and in the claims, "a color point near the P curve" is to be taken to mean that the distance from the color point to the point on the P curve having the same color temperature is maximally 20 MPCD. MPCD (minimum perceptible color difference) is the unit of chrominance, see the publication by J. J. Rennilson in Optical Spectra, October 1980, page 63. In addition to requirements to be met by the luminescent layer in connection with properties relating to the color temperature of the light emitted by the lamp and the color rendition, the luminescent layer must also comprise substances which, upon excitation by ultraviolet radiation generated in a low-pressure mercury discharge, yield a high luminous flux and which maintain this high luminous flux during the service life of the lamp.

The known lamp has a good color rendition (Ra,8>80) and a relatively high luminous efficacy (up to 90 lm/W and higher) and hence can very suitably be used for general lighting purposes. Tests have revealed that while lamps having a much better color rendition (Ra,8>90) are more appreciated by test personnel, the luminous efficacy is relatively small.

SUMMARY OF THE INVENTION

It is an object of the invention to provide a low-pressure mercury discharge lamp having a color rendition which is qualified as being relatively good by a user of the low-pressure mercury discharge lamp, and having a relatively high luminous efficacy.

In accordance with the invention the luminescent screen is further provided with a third luminescent substance which emits predominantly between 615 nm and 780 nm, and the color rendering index R9 of the low-pressure mercury discharge lamp is greater than 20.

It has surprisingly been found that, although the color rendering index Ra,8 of a low-pressure mercury discharge lamp in accordance with the invention is below 90, most users of the lamp qualify its color rendition as being at least equivalent to that of a lamp having a color rendering index Ra,8 of 90 or more, provided that the color rendering index R9 is greater than 20. The luminous efficacy of a lamp in accordance with the invention, however, is relatively high.

Although, as mentioned hereinabove, a small quantity of blue radiation is generated directly by the Hg in the discharge, it is often necessary, dependent upon the desired color temperature of the light generated by the lamp, to further provide the luminescent screen with a fourth luminescent substance having an emission maximum in the range between 430 nm and 490 nm.

It is also possible that the desired color point makes it necessary to filter out a part of the blue light generated by the Hg and add a small quantity of yellow light. This can be achieved in a relatively simple manner in that the luminescent screen also includes yttrium aluminium granate activated with cerium.

DETAILED DESCRIPTION OF THE PREFERRED EMBODIMENTS

Good results have been achieved for low-pressure mercury discharge lamps, in which the third luminescent substance has its emission predominantly in the range between 615 nm and 700 nM.

Low-pressure mercury discharge lamps having advantageous properties were obtained if the first luminescent substance comprises one or more materials of the group formed by terbium-activated cerium magnesium aluminate (CAT), gadolinium-activated and terbium-activated cerium magnesium pentaborate (CBT), and cerium-activated and terbium-activated lanthanum phosphate (LAP). Advantageous properties were also found for low-pressure mercury discharge lamps in which the second luminescent substance comprises trivalent europium-activated yttrium oxide (YOX), or in which the third luminescent substance comprises manganese-activated, gadolinium-activated and terbium-activated pentaborate of cerium and magnesium (CBTM) or manganese-activated magnesium germanate. Favorable results were achieved for low-pressure mercury discharge lamps in which the fourth luminescent substance comprises bivalent europium-activated barium magnesium aluminate (BAM). A relatively high value of Ra,8 is achieved for such lamps with a relatively high color temperature if the barium magnesium aluminate is also activated with manganese.

The use of the luminescent materials BAM, CAT, YOX, CBTM and YAG:Ce enabled inventive low-pressure mercury discharge lamps to be manufactured in a wide range of the color temperature of the light generated by the lamp. Table 1 indicates which of the above-mentioned luminescent materials were used in the luminescent screen of the lamp in dependence upon the desired color temperature. At a given color temperature, it proved possible to increase the value of R9 by increasing the intensity of the emission in the wavelength range from 615 nm to 780 nm relative to the intensity of the emission in the wavelength range from 280 nM to 780 nm. Tables 2 through 6 indicate for, respectively, the color temperatures 2700 K, 3000 K, 4000 K, 5000 K and 6500 K, the relation between the color rendering index R9 and the ratio (in %) between the emission in the wavelength range 615 nm–780 nm and the emission in the wavelength range 280 nm–780 nm. The Tables show that, independent of the color temperature of the light generated by the lamp, it is possible to choose a value for the color rendering index R9 above 20. Table 7 shows the connection between the composition of the luminescent screen, expressed in percent by weight, of a lamp in accordance with the invention with a color temperature of 2700 K and the value of the color rendering index R9.

Figure 1A:
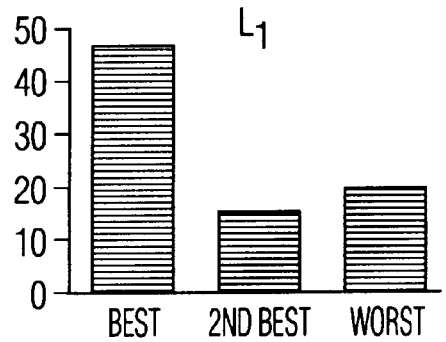
FIG. 1 shown indication of how many times the display case provided with lamp L1, L2, and L3 was chosen as the best, second best, and least good display case.
Figure 1B:
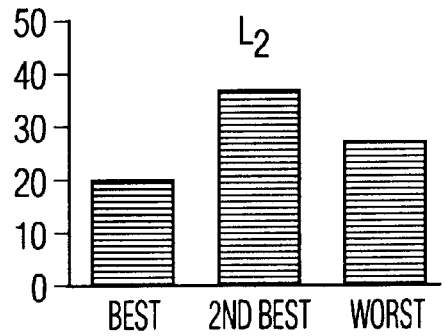
Figure 1C:
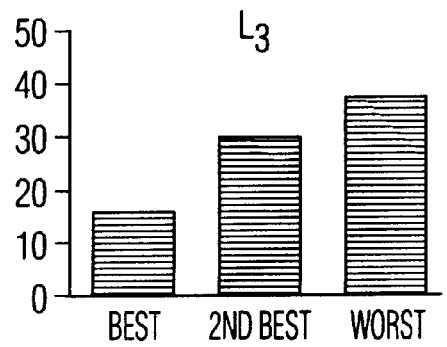

In a typical test, three display cases of equal dimensions were each provided with a first number of cloths, each of one color, and a second number of cloths, each cloth being printed with patterns in a number of colors. Each of the display cases was provided with a lamp which was not directly visible outside the display case and which diffusely and uniformly illuminated said cloths via a number of diffusers with a luminous intensity of 150 lux. Each of the lamps was a low-pressure mercury discharge lamp with a color temperature of approximately 2700 K. The first lamp L1 was a lamp in accordance with the invention whose luminescent screen included 19.5% by weight CAT, 37.2% by 15 weight YOX and 43.36% by weight CBTM. The second lamp L2 was a lamp with a very good color rendition (Ra,8>90) and the third lamp L3 was a standard low-pressure mercury discharge lamp, not in accordance with the invention, with a color rendering index Ra,8 ranging between 80 and 90. The color point, the color rendering index Ra,8 and the color rendering index R9 of these lamps L1, L2 and L3 are shown in Table 8. Approximately 40 test persons were asked to indicate which display case they preferred, and more than 50% chose the display case provided with the lamp in accordance with the invention L1. For each of the three lamps L1, L2 and L3, FIG. 1 indicates how many times the display case provided with this lamp was chosen as, respectively, the best, second best and least good display case. Other tests showed that such an evaluation by the test persons was only given if the color rendering index R9 of the lamps provided with the third luminescent substance was higher than 20. It was further found that lamps in accordance with the invention received an averagely slightly higher appreciation as the value of the color rendering index R9 was higher. However, a higher value of the color rendering index R9 means, in practice, also a lower luminous efficacy of the lamp.

TABLE 1

Phosphors used for the different color temperatures

| Color temperature (K) | BAM | CAT | YOX | CBTM | YAG:Ce |
|---|---|---|---|---|---|
| 2700 | no | yes | yes | yes | yes |
| 3000 | no | yes | yes | yes | yes |
| 4000 | yes | yes | yes | yes | no |
| 5000 | yes | yes | yes | yes | no |
| 6500 | yes | yes | yes | yes | no |

TABLE 2

Relation R9 versus radiation fraction from 615 nm relative to the overall spectrum for a color temperature of 2700K

| R9 | fraction 615–780)/(280–780) |
|---|---|
| 19.7 | 29.8 |
| 24.3 | 31.0 |
| 31.3 | 32.9 |
| 38.4 | 34.8 |
| 45.7 | 36.6 |
| 53.0 | 38.5 |

TABLE 3

Relation R9 versus radiation fraction from 615 nm relative to the overall spectrum for a color temperature of 3000K

| R9 | fraction (615–780)/(280–780) |
|---|---|
| −1.0 | 18.3 |
| 11.2 | 22.6 |
| 26.5 | 26.8 |
| 43.8 | 31.4 |
| 63.9 | 36.5 |

TABLE 4

Relation R9 versus radiation fraction from 615 nm relative to the overall spectrum for a color temperature of 4000K

| R9 | fraction (615–780)/(280–780) |
|---|---|
| 16.6 | 15.0 |
| 26.9 | 17.8 |
| 38.7 | 20.8 |
| 52.4 | 24.3 |
| 68.4 | 28.0 |

TABLE 5

Relation R9 versus radiation fraction from 615 nm relative to the overall spectrum for a color temperature of 5000K

| R9 | fraction (615–780)/(280–780) |
|---|---|
| 24.5 | 13.0 |
| 33.1 | 15.1 |
| 43.0 | 17.5 |
| 54.5 | 20.1 |
| 68.0 | 23.2 |

TABLE 6

Relation R9 versus radiation fraction from 615 nm relative to the overall spectrum for a color temperature of 6500K

| R9 | fraction (615–780)/(280–780) |
|---|---|
| 21.7 | 11.2 |
| 28.0 | 12.7 |
| 35.4 | 14.3 |
| 43.9 | 16.2 |
| 53.9 | 18.4 |

Of the color temperatures 3000 K to 6500 K, there are no examples available.

TABLE 7

R9 as a function of the layer composition (in % by weight) at a color temperature of 2700K

| R9 | CAT | YOX | CBTM | YAG |
|---|---|---|---|---|
| 19.8 | 10.38 | 47.69 | 38.58 | 3.35 |
| 24.4 | 9.75 | 42.33 | 44.20 | 3.72 |
| 29.0 | 9.15 | 36.71 | 50.04 | 4.10 |
| 36.1 | 8.19 | 28.07 | 59.03 | 4.70 |
| 40.8 | 7.51 | 22.10 | 65.26 | 5.13 |
| 45.7 | 6.86 | 15.99 | 71.59 | 5.56 |
| 50.5 | 6.12 | 9.65 | 78.21 | 6.02 |

TABLE 8

| LAMP | x | y | lm/W | Ra8 | R9 |
|---|---|---|---|---|---|
| L1 | .4729 | .4209 | 80 | 85.0 | 40 |
| L2 | .4764 | .4240 | 70 | 92.8 | 63 |
| L3 | .4766 | .4257 | 100 | 83.1 | −27 |

What is claimed is:

1. A low-pressure mercury discharge lamp having color rendering indices Ra,8 between 80 and 90 and R9 greater than 20, a color point on or near the Planckian curve and comprising a gastight lamp vessel which allows passage of visible light, contains Hg and one or more inert gases and is provided with a luminescent screen including a first luminescent substance which emits predominantly between 520 nm and 565 nm, and a second luminescent substance which emits predominantly between 590 nm and 630 nm, and a third luminescent substance which emits predominantly between 615 nm and 780 nm.

2. A low-pressure mercury discharge lamp as claimed in claim 1, wherein the luminescent screen further comprises a fourth luminescent substance having its emission maximum in the range between 430 nm and 490 nm.

3. A low-pressure mercury discharge lamp as claimed in claim 1, wherein the luminescent screen also comprises yttrium aluminium granate activated with cerium.

4. A low-pressure mercury discharge lamp as claimed in claim 1 wherein, in which the third luminescent substance has its emission predominantly in the range between 615 nm and 700 nm.

5. A low-pressure mercury discharge lamp as claimed in claim 1 wherein the first luminescent substance comprises one or more materials of the group formed by terbium-activated cerium magnesium aluminate, gadolinium-activated and terbium-activated cerium magnesium pentaborate, and cerium-activated and terbium-activated lanthanum phosphate (LAP).

6. A low-pressure mercury discharge lamp as claimed in claim 1 wherein, in which the second luminescent substance comprises trivalent europium-activated yttrium oxide (YOX).

7. A low-pressure mercury discharge lamp as claimed in claim 1 wherein, in which the third luminescent substance comprises one or more materials of the group formed by manganese-activated, gadolinium-activated and terbium-activated pentaborate of cerium and magnesium and manganese-activated magnesium germanate.

8. A low-pressure mercury discharge lamp as claimed in claim 2 wherein, in which the fourth luminescent substance comprises bivalent europium-activated barium magnesium aluminate.

9. A low-pressure mercury discharge lamp as claimed in claim 8, in which the barium magnesium aluminate is also activated with manganese.

* * * * *